W. J. KENNEDY.
DRILL STAND.
APPLICATION FILED OCT. 19, 1912. RENEWED MAY 15, 1917.

1,251,046.  Patented Dec. 25, 1917.

WITNESSES
C. H. Bertholf
Vernon See

INVENTOR
William J. Kennedy
BY
Garry P. Van Wye
ATTORNEYS

UNITED STATES PATENT OFFICE.

WILLIAM J. KENNEDY, OF JERSEY CITY, NEW JERSEY.

DRILL-STAND.

1,251,046.   Specification of Letters Patent.   Patented Dec. 25, 1917.

Application filed October 19, 1912, Serial No. 726,714. Renewed May 15, 1917. Serial No. 168,870.

*To all whom it may concern:*

Be it known that I, WILLIAM J. KENNEDY, a citizen of the United States, residing at Jersey City, in the county of Hudson and State of New Jersey, have invented a new and useful Drill-Stand, of which the following is a specification.

This invention relates to stands for holding hand, or electrically-operated drills, and the like, in operative position; and the object of my invention is to provide a stand of the character described which may be quickly adjusted to hold a drill in any position desired and in a firm manner; a further object of my invention is to provide a stand of the character described which will be cheap to manufacture and efficient in use.

The invention is illustrated in the accompanying drawing, in which—

Figure 1:
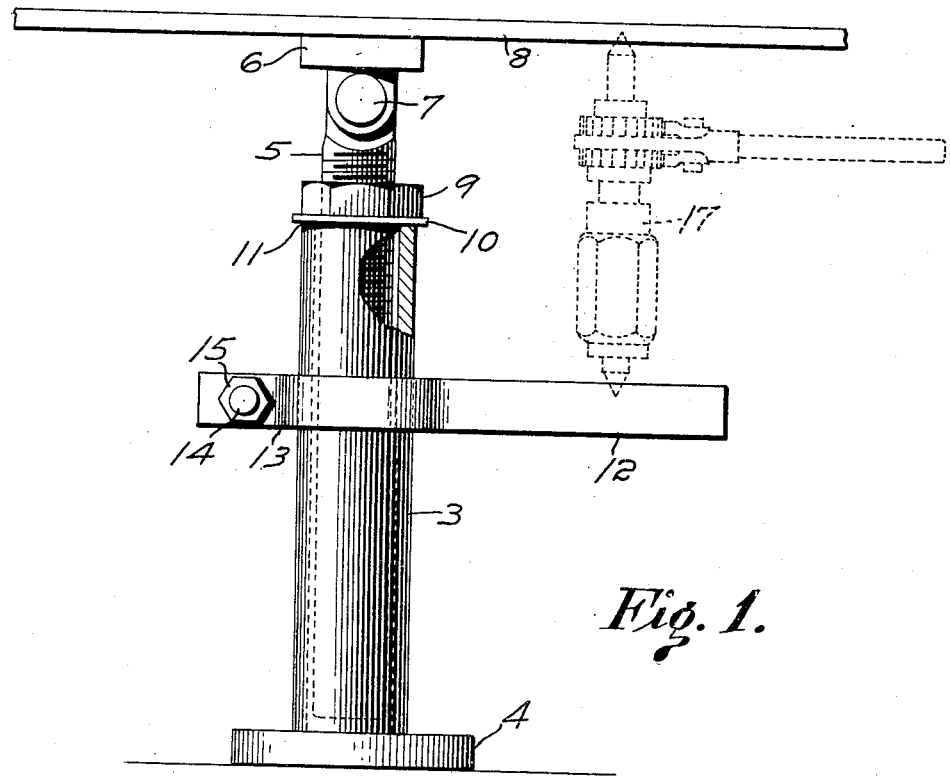
Figure 2:
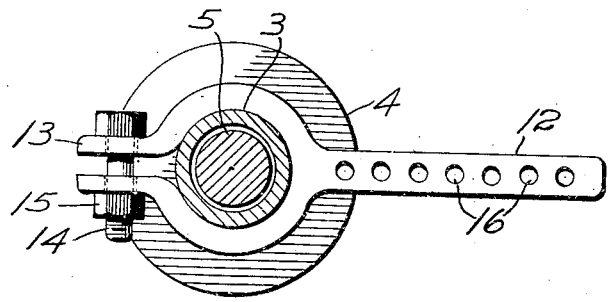

Figure 1, is an elevation of a drill stand constructed according to my invention, in operative position, a part being broken away to show the construction; and Fig. 2, is a plan view of the supporting arm in position.

In the drawing like numerals of reference refer to the same parts in each of the views.

In practice I provide a drill stand comprising a tubular part 3, on the lower end of which is fixed a collar, or base 4, whereby the tubular part is supported in an upright position. I also provide a screw-threaded shaft 5, preferably carrying a head 6, which may be pivotally connected with the shaft 5, as shown at 7, so that the head will readily adjust itself to any object, as 8, against which it may be placed, as will be readily understood. Mounted on the shaft 5, is a nut 9, and I also prefer to use a washer 10, sufficient in size to be interposed between the nut 9, and the open end 11, of the tubular part 3 whereby the shaft 5, may be moved longitudinally of the part 3 by the rotation of the nut 9, without frictional contact between the nut 9, and end 11, of the tube.

On the tubular part 3, I mount an arm 12, having a clamping part 13, which may be operated by a bolt 14, and nut 15, whereby the arm 12, may be secured at any longitudinal point of the tube 3, and in any radial direction. The arm 12, is preferably provided with a plurality of recesses 16, adapted to engage a drilling device, as 17, and hold the same against slipping when being used, as will be understood.

In operation, when it is desired to use a drill on any object positioned at some distance from the ground, or other support, the drill stand is inserted between the support and the object, preferably with the base 4, against the support; the shaft 5, is then drawn out until the head 6, is against the object; the nut 9, is then screwed down the shaft 5, until the washer 10, has been brought into close contact with the end 11, of the tube, and is then turned a sufficient distance additionally to cause some stress whereby the stand will be rigidly held in position, as will be understood. The arm 12, is then adjusted longitudinally of the tube 3, and positioned to hold the ratchet, or other drilling device in the right position for drilling the desired hole, either with the drill in the position as indicated in dotted lines in Fig. 1, or on the other side of the arm drilling through the object against which the base 4, rests, for it is evident that the arm 12, will support a drilling device in exactly the same manner whether located above the arm, or below the arm so that in general it will make no difference whether the head 6, is placed against the object to be drilled, or the base 4, is placed against it.

In the drawing I have indicated that my drill stand is to be used with an ordinary hand ratchet drill. I do not wish, however, to limit my invention to such a use for the reason that it is equally suitable for use with an electrically-operated, or air-operated drill.

It is common practice now in drilling a hole within the fire box of a boiler, or in other confined spaces, to block the drilling device up in place with a number of blocks at great trouble and with considerable expense. With my stand a drill can be quickly placed in position and held there without a large amount of material in the way to interfere with the workman. Then, too, as the arm 12, can be turned in any radial direction, it is evident that the stand, or rather the upright part thereof can be placed within a confined space, as a fire box, at a point to interfere in the least possible manner with the workman and yet have the drill held in the right position for drilling the desired hole.

Having thus described my invention, what I claim as new and desire to secure by Letters Patent of the United States, is—

1. A drill stand comprising a tubular part having a base, a screw-threaded shaft adapted to slide therein, a nut mounted on said screw-threaded shaft and adapted to bear against one end of said tubular part whereby said shaft and tubular part may be moved longitudinally relative to each other, and an arm adjustably mounted on said tubular part, for the purpose set forth.

2. A drill stand comprising a tubular part having a base, a screw-threaded shaft adapted to slide therein, a nut adapted to force said shaft out of said tubular part, and a radially-extending arm slidably mounted on said tubular part and means to clamp said arm in any position, for the purpose set forth.

3. The hereindescribed drill stand comprising a cylindrical tube having a collar or base on one end, a shaft adapted to slide therein said shaft being screw threaded, a head pivotally mounted on the end of said shaft, a nut and washer adapted to engage the open end of said tubular part and force said shaft in an outward direction, and an arm having a divided end adapted to encircle said tubular part and having a bolt mounted therein whereby clamping engagement may be made with said tubular part, said arm having a plurality of recesses adapted to engage a drilling device, for the purpose set forth.

Dated New York, October 17th, 1912.

WILLIAM J. KENNEDY.

Witnesses:
VERNON SEE,
JAMES A. WHITE.

Copies of this patent may be obtained for five cents each, by addressing the "Commissioner of Patents, Washington, D. C."